United States Patent

Hoppe

(10) Patent No.: US 6,514,183 B2
(45) Date of Patent: Feb. 4, 2003

(54) MACHINE TOOL

(75) Inventor: Gerd Hoppe, Habichtswald (DE)

(73) Assignee: Deckel Maho GmbH, Pfronten (DE)

( * ) Notice: Subject to any disclaimer, the term of this patent is extended or adjusted under 35 U.S.C. 154(b) by 0 days.

(21) Appl. No.: 09/473,331

(22) Filed: Dec. 28, 1999

(65) Prior Publication Data

US 2002/0107122 A1 Aug. 8, 2002

(30) Foreign Application Priority Data

Dec. 28, 1998 (DE) .......................... 198 60 492

(51) Int. Cl.$^7$ .............................. B23Q 3/157
(52) U.S. Cl. .............................. 483/46; 39/67; 39/902; 39/57; 409/230
(58) Field of Search .................. 483/38–46, 58, 483/65, 67, 31, 32, 902, 54, 57; 409/230

(56) References Cited

U.S. PATENT DOCUMENTS

| | | | |
|---|---|---|---|
| 3,256,600 A | | 6/1966 | Swanson et al. |
| 3,757,637 A | * | 9/1973 | Eich et al. .................. 409/230 |
| 3,820,234 A | * | 6/1974 | Poincenot ................... 483/46 |
| 3,930,301 A | * | 1/1976 | Wagner ....................... 483/32 |
| 4,318,665 A | * | 3/1982 | Carroll et al. ............... 483/46 |
| 4,412,766 A | * | 11/1983 | Eckstein ..................... 409/233 |
| 4,423,545 A | * | 1/1984 | Carroll et al. ............... 483/39 |
| 4,622,734 A | * | 11/1986 | Kolblin et al. ............... 483/41 |
| 4,709,455 A | * | 12/1987 | D'Andrea ..................... 29/40 |
| 4,709,465 A | * | 12/1987 | Lewis et al. ................. 409/230 |
| 5,093,978 A | * | 3/1992 | Binder ....................... 483/43 |
| 5,213,559 A | * | 5/1993 | Lunazzi ...................... 483/31 |
| 5,322,494 A | * | 6/1994 | Holtey et la. ................ 483/12 |
| 5,697,739 A | * | 12/1997 | Lewis et al. ................. 409/230 |
| 5,823,722 A | * | 10/1998 | Takenaka ..................... 409/230 |
| 5,878,476 A | * | 3/1999 | Noelle et al. ................ 409/230 |
| 6,402,443 B1 | * | 6/2002 | Hoppe ........................ 409/230 |

FOREIGN PATENT DOCUMENTS

| | | | |
|---|---|---|---|
| DE | 9100557.4 | 5/1991 | ......... B25J/18/00 |
| DE | 19534093 | 3/1997 | ......... B23Q/3/155 |

* cited by examiner

*Primary Examiner*—A. L. Wellington
*Assistant Examiner*—Erica E Cadugan
(74) *Attorney, Agent, or Firm*—The Maxham Firm

(57) ABSTRACT

A machine tool comprising a machining spindle, a device for inserting an auxiliary unit into the machining spindle, a tool magazine for providing a multitude of tools and a tool changer comprising at least one tool gripper for holding tools for the machining spindle for the transportation of tools between the tool magazine and an exchange position at the machining spindle. To ensure an automatic supply to the machining spindle as well as to the auxiliary unit in a simple and fast way the tool changer has at least one additional tool gripper for holding tools for the auxiliary unit.

2 Claims, 3 Drawing Sheets

MACHINE TOOL

BACKGROUND

1. Field of Invention

This invention relates generally to machine tools, and more particularly to a machine tool having a machining spindle, a device for inserting an auxiliary unit into the machining spindle, a tool magazine for providing a multitude of tools and a tool changer having at least one tool gripper for holding tools for the machining spindle for the transportation of tools between the tool magazine and the machining spindle.

2. Discussion of Related Art

In known machine tools of the above mentioned type, for example, a high speed spindle or a polishing head insertable into the machining spindle, if necessary, are used as the auxiliary unit. Thus the speed range for certain machining operations can be increased and the application range of the machine tool can be widened. For high speed spindles or other auxiliary units, however, generally tool holding fixtures different from those used for the machining spindle are required. In conventional machine tools the tool exchange at the auxiliary units is therefore often effected manually or by separate changing devices. This is either time consuming or requires increased expenses with respect to construction and control.

SUMMARY OF THE INVENTION

It is a primary purpose of the invention to provide a machine tool of the above mentioned type enabling a fully automated supply of the respectively required tools to the machining spindle as well as the auxiliary unit to be inserted into the machining spindle in a simple and fast manner.

The most important advantage of the machine tool according to the invention is that not only different tools for the machining spindle but also a plurality of tools for an auxiliary unit inserted into the machining spindle can be provided for machining and may be automatically exchanged by a common tool changer. For the automatic exchange of the tools in the auxiliary unit no expensive additional driving and control elements are required. Thus a fully automated complete machining may be carried out without manual operations.

The tool changer comprises a quadruple gripper arrangement including two diametrically opposed tool grippers for holding tools for the machining spindle and two additional tool grippers respectively displaced by 90° with respect to these for holding tools for the auxiliary unit. By simply rotating the quadruple gripper arrangement by 90° the tool changer can thus be used as a double gripper for supplying tools to the machining spindle or as a double gripper for supplying tools to the auxiliary unit. By the respectively opposed pairs of grippers a previously used tool on the machining spindle can be replaced by a new tool taken out of the tool magazine beforehand by turning the gripper arrangement by 180°. Thus a fast tool exchange, including minimal control requirements, is enabled at the machining spindle as well as at the auxiliary unit inserted into the machining spindle.

The auxiliary unit may, for example, be a high speed spindle, a polishing head or any other assembly device by which the range of applications of the machine tool may be widened.

The tools are generally held in special tool holding fixtures by corresponding clamping cones. Since the tool holding fixtures for the machining spindle are, as a rule, larger than those for the tools of the auxiliary unit, the corresponding tool grippers for the respective tool holding fixtures are also of a different sizes.

In a constructively simple embodiment the tool gripper is disposed on a support horizontally movable on a frame of the tool magazine by means of a linear drive and can be rotated about a vertical axis by means of a motor. The horizontal movement of the support and the rotation of the tool gripper may be effected via electrical, hydraulic or pneumatic actuator drives.

BRIEF DESCRIPTION OF THE DRAWING

The objects, advantages and features of the inventions will be more clearly perceived from the following description, when read in conjunction with the accompanying drawing, in which.

DETAILED DESCRIPTION OF THE PREFERRED EMBODIMENTS

Figure 1:
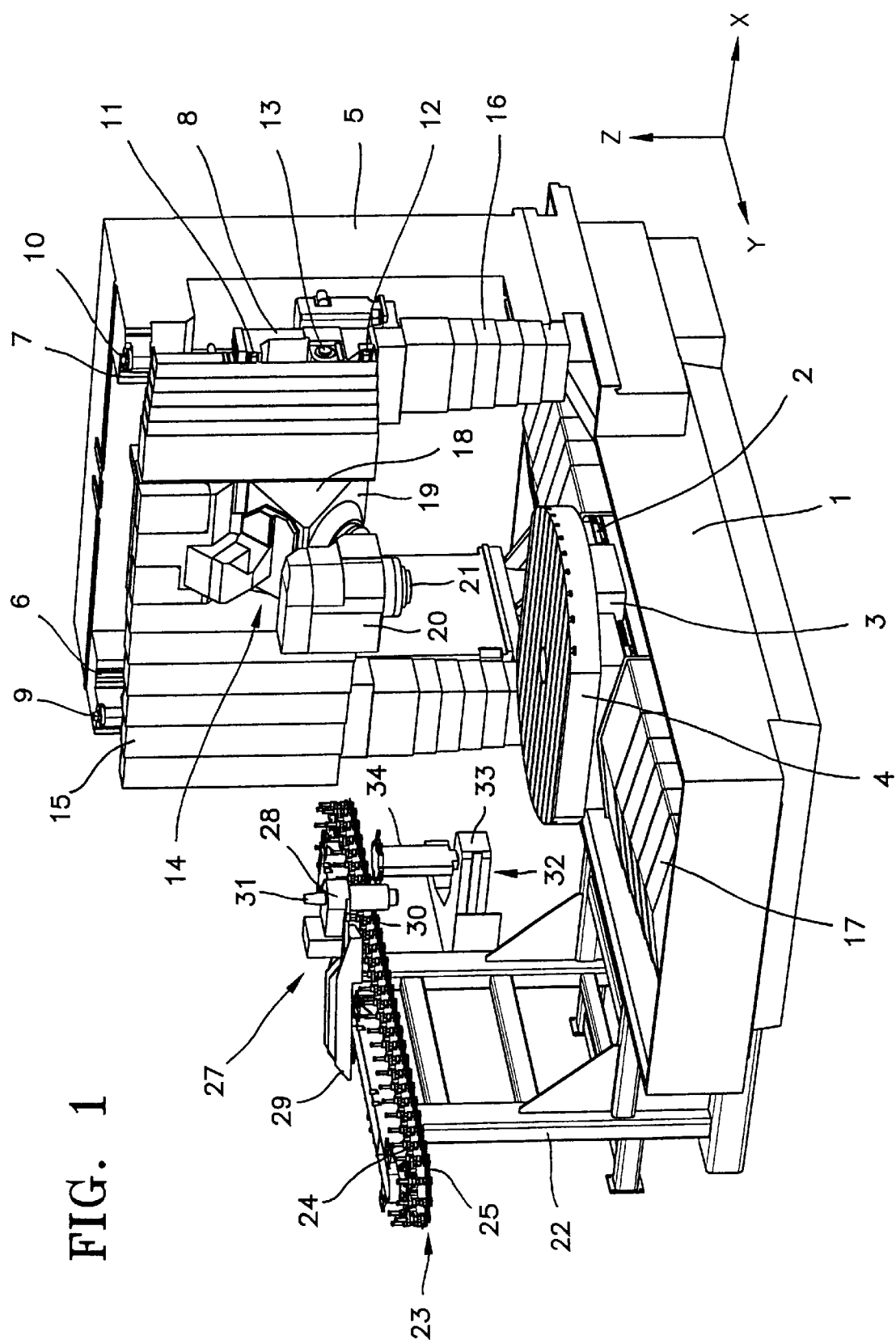
FIG. 1 is a perspective illustration of a machine tool constructed according to the invention.

The machine tool shown in FIG. 1 contains a machine bed 1 which has horizontal guide rails 2 on which table sled 3, which is shiftable in the Y-direction by a motor (not shown), and a workpiece table 4 is disposed on the sled and is rotatable about a vertical axis. On machine bed 1 is disposed main frame 5 which includes vertical guide rails 6 and 7 on which transverse support 8 is guided, vertically shiftable in the Z-direction via threaded spindles 9 and 10 which are driven by a motor (not shown). On the front side of transverse support 8 are horizontal guiding rails 11 and 12 which provide for guiding machining unit 14 horizontally shiftable in the X-direction via threaded spindle 13 driven by a motor (not shown). Guide rails 11 and 12 for the machining unit, guide rails 6 and 7 for the transverse support, and guide rails 2 for the table sled are protected against contamination by different cover sheets 15, 16 and 17, respectively.

Horizontally movable machining unit 14, which is guided on transverse support 8, comprises support housing 18 including face wall 19 inclined by 45° with respect to the vertical plane and oriented obliquely downwardly on which a pivotable milling head 20, pivotable about a pivoting axis perpendicular to the face wall 19, is mounted. In pivotable milling head 20 machining spindle 21 is disposed at less than 45° with respect to the pivoting axis. The milling head may be pivoted between the vertical machining posture shown in FIG. 1 and a horizontal machining posture by a corresponding rotation of pivotable milling head 21.

Tool magazine 23, formed as a chain hopper and comprising frame 22 and link chain 24, circulates on the upper side of the frame. The chain is driven by a motor and includes tong shaped tool holders 25. Tool magazine 23 is laterally disposed on machine bed 1.

Also on the upper side of frame 22 is a device 27 for holding and inserting high speed spindle 28. Device 27 comprises gripper arm 30 horizontally movable on guide arm 29 in which high speed spindle 28 is held by clamping cone 31 protruding upwardly. By horizontally shifting gripping arm 30 high speed spindle 28 can be moved into a replacement position under machining spindle 21 when the spindle is moved into an exchange position. By a vertical movement of machining unit 14 in the Z-direction high speed spindle 28, including its clamping cone 31, can then be inserted into machining spindle 21 and fixed there by corresponding standard or known clamping means.

Additionally, tool changing means 32, including offset support 33 shiftable in the X-direction by a motor (not shown), is laterally disposed on frame 22. Tool changer 34, shown in detail in FIGS. 2–4 and turnable about a vertical axis, is mounted on support 33.

Figure 2:
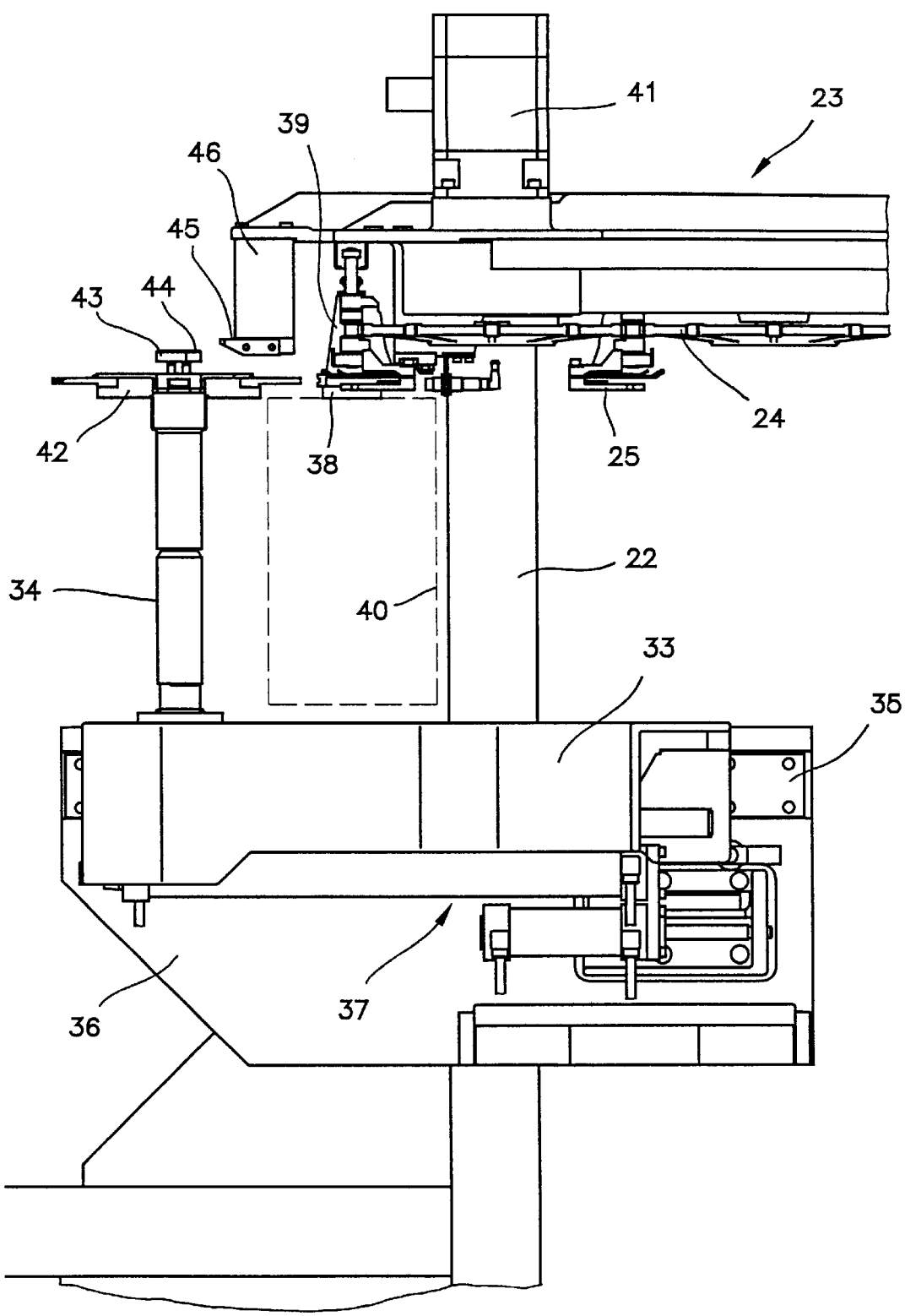
FIG. 2 is a side view of a part of the tool magazine including a tool changer on the machine tool of FIG. 1.

As can be seen from FIG. 2 in particular, support 33 is guided on rail 35 attached to accommodation 36 which is laterally disposed on frame 22 in the embodiment shown. The horizontal movement of support 33 is effected by linear drive 37 which may be formed as a hydraulic, electric or pneumatic drive. At the front end of support 33 is disposed the tool changer which is turnable about a vertical axis by a drive (not shown). At the upper side of frame 22 is link chain 24 which includes tong shaped tool holders 25. These are provided to hold tool holding fixtures 38 of different sizes for the tools of machining spindle 21 and for those of high speed spindle 28. Tools having the maximum dimensions indicated by broken line 40 can be inserted into tool holding fixtures 38, each of which is provided with clamping cone 39 protruding vertically upwardly. However, tools provided with a clamping cone formed directly thereon may also be held by tool holding fixtures 25. Link chain 24 is driven by actuator motor 41 via an appropriate gear arrangement or a sprocket chain, for example. By correspondingly instructing actuator 41 the desired tools corresponding to the respective machining program can be moved into a predetermined exchange position in which tool changer 34, including its quadruple gripper arrangement 42 shown in detail in FIGS. 3 and 4, can come into engagement with the tool or its tool holding fixture 38 with a corresponding horizontal movement of support 33.

Two operating buttons 43 and 44 for releasing a gripper catch (not shown in detail) are disposed at the upper side of quadruple gripper arrangement 42. Operating buttons 43 and 44 are operable by a wedge shaped operating element 45 at the bottom side of actuator arm 46 attached to frame 22 when the tool changer 34 is inserted into the tool magazine.

Figure 3:
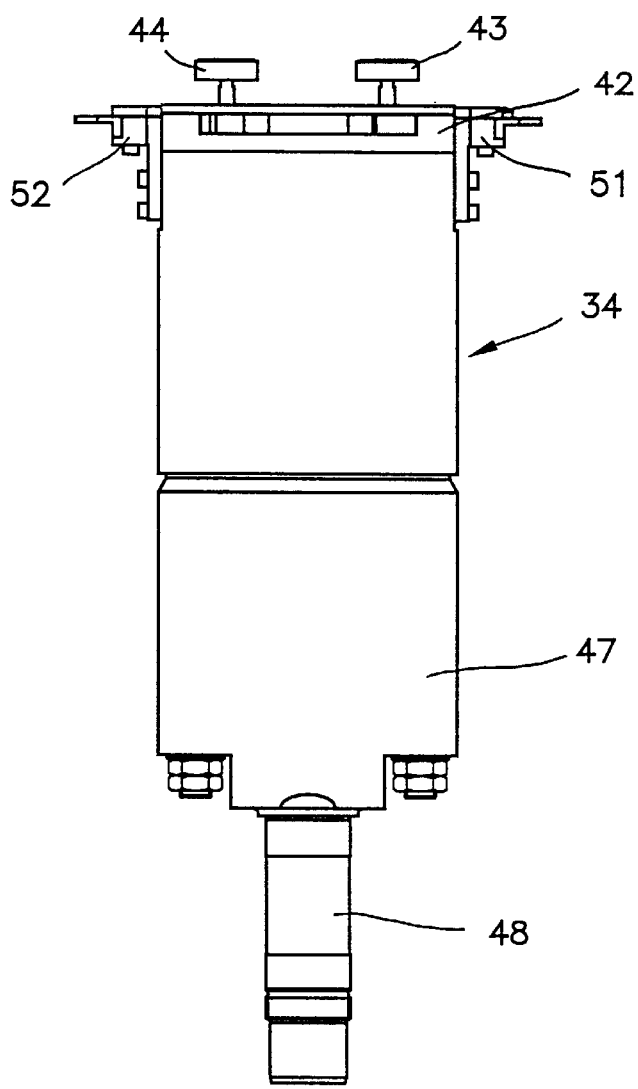
FIG. 3 is a side view of the tool changer of FIG. 2.
Figure 4:
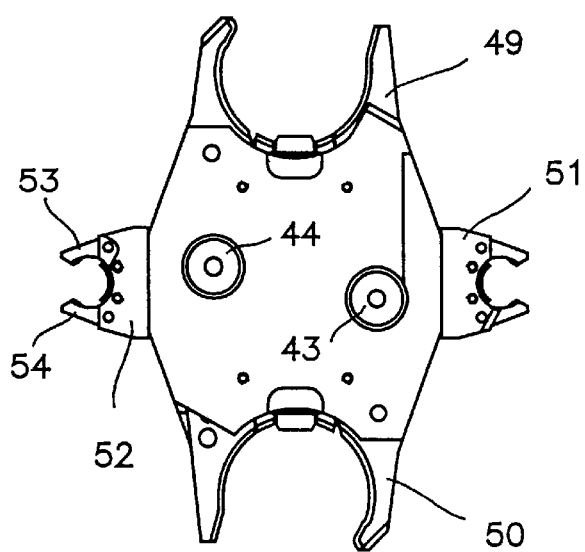
FIG. 4 is a plan view of the tool changer of FIG. 3.

As shown in FIG. 3, tool changer 34 comprises support post 47 having a quadratic diameter on the upper side of which quadruple gripper arrangement 42 is arranged. At the bottom side of support post 47 tappet 48 is provided via which support post 47 is rotatably borne in support 33. According to FIG. 4, quadruple gripper arrangement 42 comprises two diametrically opposed tool grippers 49 and 50 which are provided for removing or holding the tools insertable into machining spindle 21 or their tool holding fixtures. Two additional tool grippers 51 and 52, which are also diametrically opposed, serve to remove and hold the tools insertable into the high speed spindle or their tool holding fixtures. Tool grippers 51 and 52 are arranged in an offset angle of 90° with respect to tool grippers 49 and 50. Since high speed spindle 28 is designed to receive smaller tools or tool holding fixtures than the machining spindle, additional tool grippers 51 and 52 are correspondingly dimensioned smaller as well.

On the upper side of quadruple gripper arrangement 42 are arranged the two operating buttons 43 and 44. By depressing the catch of the tool grippers for exchanging the tools preloaded to the inside, for example, by springs, the tools are released.

In the machine tool illustrated in FIG. 1, a tool exchange is effected as now described. For exchanging tools in machining spindle 21 tool magazine 23 is moved in correspondence with a predetermined machining program so that the desired tool holding fixture 25 containing the required tool is moved into a predetermined exchange position. Then support 33, including tool changer 34, is moved in the direction of tool magazine 23 from the standby posture shown in FIG. 2 until tool gripper 49, directed to the tool magazine, comes into engagement with tool holding fixture 38. After that, tool changer 34, including the tool taken from the tool magazine 23, is moved under machining spindle 21, which has been shifted into a take-over position. Support 33 is moved away from the tool magazine so that empty tool gripper 50 can take up the tool positioned in machining spindle 21. Then machining unit 14 is moved upwardly in a Z-direction after a per se known tool clamp within machining spindle 21 has been released. By a subsequent turn of tool changer 34 by 180° the new tool is then moved under the machining spindle. The machining spindle is then again moved in the Z-direction and the tool clamp is reactivated. By moving support 33 the previous tool can then again be placed in tool magazine 23, and tool changer 34 is moved back to its standby posture by a corresponding movement of support 33.

The exchange of the tools at high speed spindle 28 previously inserted into machining spindle 21 by device 27 is effected correspondingly. Tool changer 34 is first turned by 90° so that additional tool grippers 51 of 52 are used.

The invention is not limited to the embodiment described in detail and illustrated in the drawing. Thus, the tool magazine including the tool changing means may also be used for machine tools having another design. In addition, the different gripper for the tools of the machining spindle and the tools of the auxiliary unit may be disposed in a different orientation corresponding to the design of respective the machine tool. Instead of the complete tool changer only the quadruple gripper arrangement may also be formed in a turnable fashion.

What is claimed is:

1. A machine tool comprising:

a machining spindle that operates throughout a range of speeds;

an auxiliary unit comprising a spindle with means for operating said auxiliary unit at speeds greater than the range of speeds of the machining spindle;

a tool magazine for providing a plurality of tools, said magazine containing tools adapted for use in the auxiliary unit as well as tools adapted for use in the machining spindle;

a device for inserting said auxiliary unit into said machining spindle wherein said device for inserting said auxiliary unit into said machining spindle is disposed on top of said tool magazine and comprises a gripping arm and a guiding arm, said gripping arm being movably mounted on said guiding arm and having means for holding said auxiliary unit;

a frame on which said tool magazine is mounted;

a support horizontally shiftable on said frame;

a linear drive coupled between said frame and said support; and a tool changer for moving the tools between said tool magazine and said auxiliary unit as well as between said tool magazine and an exchange position at said machining spindle, wherein said tool changer is rotatably mounted on said support beneath said tool magazine comprises:

a quadruple gripper arrangement provided with two diametrically opposed first tool grippers for gripping tools for use in said machining spindle, and two additional second tool grippers for gripping tools for use in said auxiliary unit respectively displaced by 90° with respect to said first tool grippers, said first tool grippers and said second tool grippers being shaped and configured for holding tool holding fixtures of different sizes, said quadruple gripper arrangement being disposed on said support and being rotatable about a vertical axis.

2. The machine tool according to one of the claim 1, wherein said tool changer comprises a releasable gripper catch.

* * * * *